Patented Dec. 6, 1949

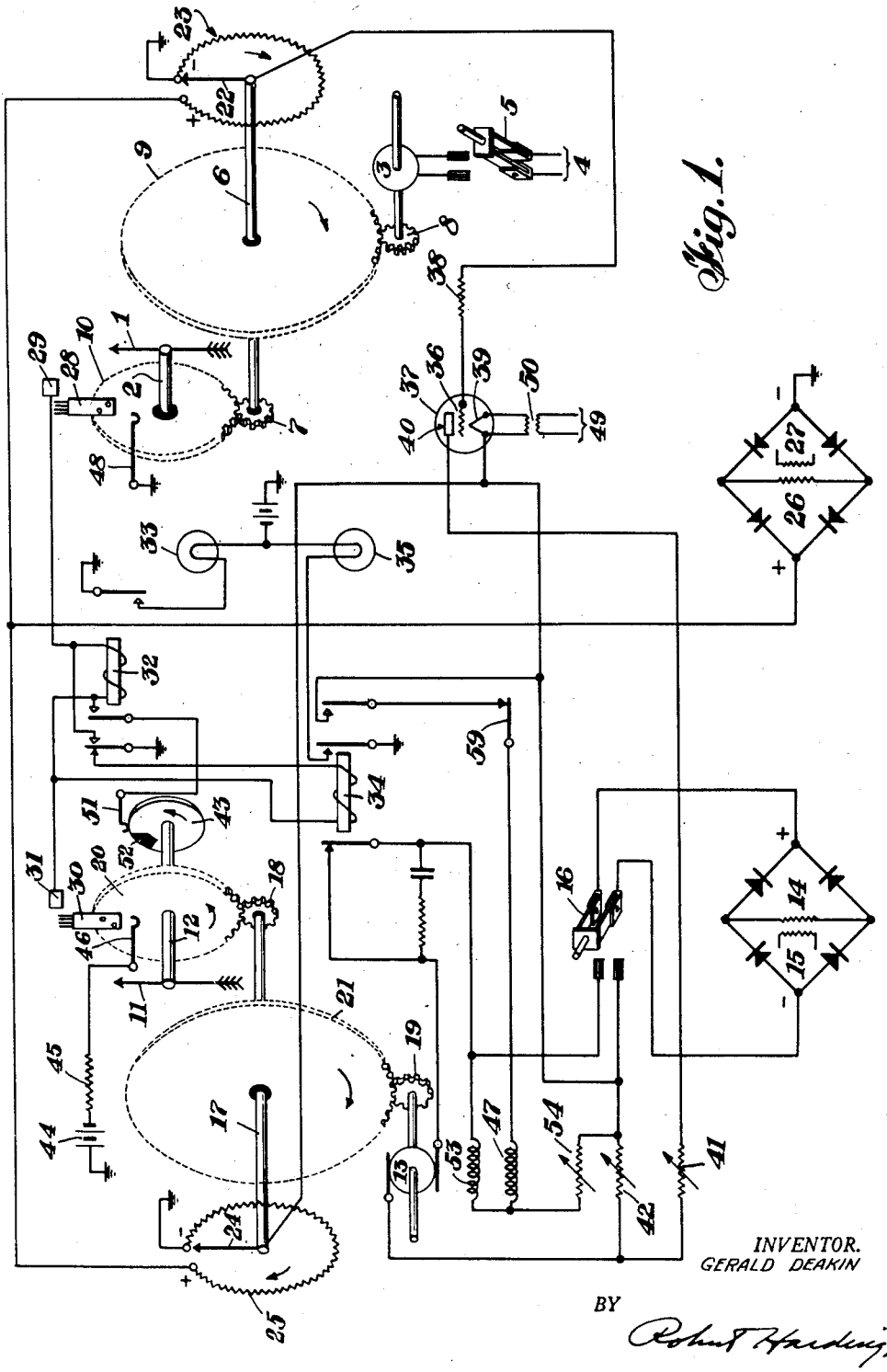

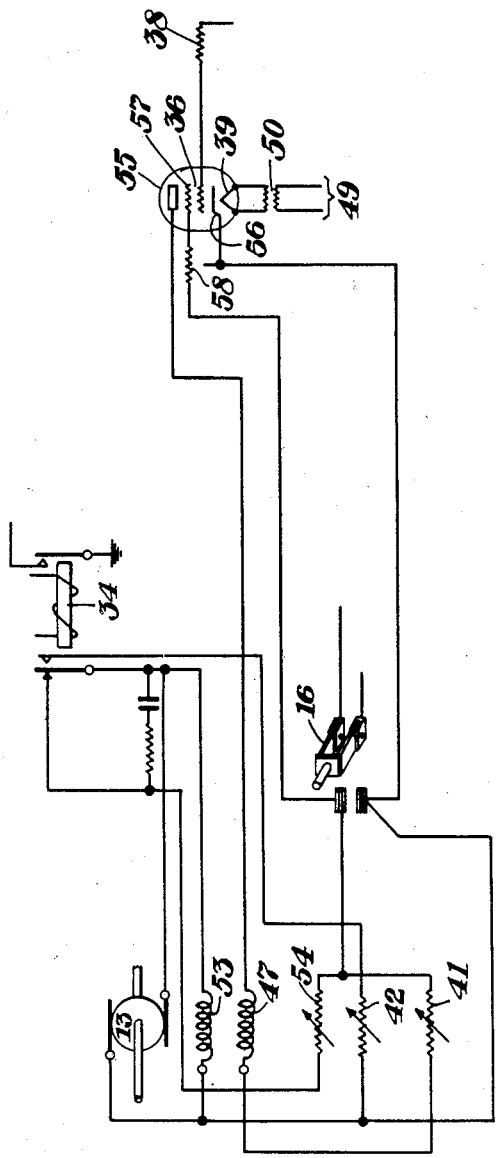

2,490,034

UNITED STATES PATENT OFFICE 2,490,034

PHASE AND SYNCHRONISM CONTROL SYSTEM

Gerald Deakin, New York, N. Y., assignor to International Standard Electric Corporation, New York, N. Y., a corporation of Delaware Application October 2, 1944, Serial No. 556,791

10 Claims. (Cl. 318—18)

This invention relates to phase and synchronism control.

A principal object of the invention is to provide an apparatus for maintaining a rotating shaft in synchronism with another rotating shaft.

Another object of the invention is to provide a method and apparatus for starting the rotation of a shaft in synchronism and in phase alignment with another continuously rotating shaft.

Still another object of the invention is to provide an apparatus for indicating when a rotating shaft is in synchronism with another rotating shaft and has the same phase relation thereto.

Still another object is to provide an apparatus and a method for use between a remotely positioned shaft arranged to rotate an element attached to the shaft at the remote point and a second shaft having an indicating pointer attached thereto at the control point, said apparatus maintaining said second shaft in synchronism and in phase alignment with said remotely positioned shaft.

This invention is illustrated in the accompanying drawings, in which Fig. 1 is a schematic diagram showing the circuit and apparatus in one form of the invention, and Fig. 2 is a modification of Fig. 1 as an alternative.

In general, the rotatable element and indicator and associated shafts to be maintained in phase and synchronism are each under the control of a motor but geared so that they will run at a much slower speed. Each motor is geared to a potentiometer which also operates at a much slower speed than the motors but faster than the element and indicator. The brush of the potentiometer driven by the remotely positioned shaft is connected to the grid of a vacuum tube and the brush of the other potentiometer is connected to the filament or cathode. The plate circuit or anode is connected to the motor driving the control shaft in a manner to regulate the amount of current received in order to control its speed. If the motor connected to the plate circuit gets faster than the other, the amount of plate current is reduced by a greater negative potential on the grid in relation to the cathode and slows the motor down, and vice versa if the same motor becomes too slow.

Referring to Fig. 1, pointer 1, representing the continuously driven element attached to shaft 2 can be rotated under the control of motor 3 by means of current at line 4 by closing switch 5. Shaft 2 runs at a much slower speed than motor 3 and is controlled by way of auxiliary shaft 6, pinion gears 7 and 8 and gear wheels 9 and 10, At the indicating end it is desired to control pointer 11 attached to shaft 12 in phase and synchronism with pointer 1. Pointer 11 attached to shaft 12 can be rotated under the control of shunt wound motor 13 by means of current from rectifier 14 by connecting it to a suitable source of A. C. current at 15 through closing switch 16. Shaft 12 runs at a much slower speed than motor 13 and is controlled by way of auxiliary shaft 17, pinion gears 18 and 19 and gear wheels 20 and 21. When the apparatus is operating properly, pointer 11 is an indicator which at any particular moment indicates the position of pointer 1.

Brush 22 of potentiometer 23 is directly connected to shaft 6, while brush 24 of potentiometer 25 is directly connected to shaft 17. One end of the winding of each of these potentiometers gets direct current from rectifier 26 from a suitable source of A. C. current at 27. The other ends of the potentiometer windings are returned to the negative side of the rectifier 26 by connecting to ground.

A brush 28 mounted upon gear wheel 10 is arranged to pass over a contact 29 during its revolution. Similarly, a brush 30 attached to gear wheel 20 is arranged to pass over a contact 31. A relay 32 is arranged to operate through a circuit closed by the brushes 28 and 30 and the contacts 29 and 31 when the apparatus is in synchronism and to lock in a manner to be later described. Relay 32 operates lamp 33 to give an indication.

A relay 34 has a back contact included in the circuit of the armature of motor 13 and is arranged to stop motor 13 under certain conditions and light lamp 35 as an indication in a manner to be described later.

Brush 22 of potentiometer 23 is connected to control grid 36 of a thermionic tube 37 by way of resistance 38. Brush 24 of potentiometer 25 is connected to cathode 39 of tube 37. Plate 40 of tube 37 is connected to the negative side of the armature of motor 13 by way of variable resistance 41. Cathode 39 of tube 37 is also connected to the negative terminal of the switch 16. The plate-cathode circuit of tube 37 including the variable resistance 41 is connected across another variable resistance 42 included in the armature circuit.

Referring now to the operation of the circuit, shaft 2 and shaft 12 are to be maintained in synchronism and phase. The approximate speed of the motors for this particular illustration is 1200 R. P. M. They are geared to the respective brushes of their potentiometers 23 and 25 so that the brushes will rotate at 40 R. P. M. The potentiometers are geared to their respective element and indicating devices 1 and 11 so that the latter devices rotate at 4 R. P. M.

To get shaft 2 and shaft 12 in synchronism and phase, motor 13 is started by the operation of switch 16 which connects rectifier 14 across the motor. No filter is required for operating a motor from a rectifier. Indicating device 11 and a commutator 43, mounted on the same shaft, then rotate until brush 30 passes onto contact 31, at which time relay 34 operates and opens the circuit to the armature of motor 13. This circuit may be traced from battery 44, resistance 45, brush 46, gear wheel 20, brush 30, contact 31, relay 34 to ground at the left back contact of relay 32. The right hand contact of relay 34 connects in an additional field winding 47 on motor 13 so that the inertia of the armature will be overcome rapidly, thereby causing it to cease rotation before brush 30 rides off contact 31. Winding 47 operates as a damping winding, being short circuited through resistor 52 and the right hand contact of relay 34. Another front contact adjacent to the coil of relay 34 lights lamp 35 as an indication.

Motor 3 is now started by the operation of switch 5 which makes connection with suitable A. C. current at point 4. Element 1 then rotates until brush 28 passes onto contact 29 at which time relay 32 operates from battery 44 in series with resistance 45, brush 46, gear wheel 20, brush 30, contact 31, winding of relay 32, contact 29, brush 28, gear wheel 10, brush 48 to ground. This releases relay 34 at a left back contact of relay 32. The release of relay 34 connects the armature of motor 13 back in the circuit and it is started. Since the brush 22 of potentiometer 23 moves faster with a flying start than brush 24 of potentiometer 25 can from a still start, a greater amount of plus potential from potentiometer 23 is placed on grid 36 of tube 37 in relation to that on cathode 39 received from brush 24 of potentiometer 25. This decreases the plate-cathode resistance of tube 37 which permits more current to flow in the armature circuit and thus speeds up motor 13. Cathode 39 is energized from suitable A. C. current at point 49 by way of transformer 50.

Motor 13 speeds up until it catches up with motor 3, at which time the two potentiometers reach a normal running speed where no current is flowing in the plate-cathode circuit of tube 36. This circuit, which is shunted across variable resistance 42, may be traced from the negative terminal of rectifier 14 through the lower arm of switch 16, through tube 37 by way of cathode 39 and plate 40, resistance 41, armature of motor 13, back contact of relay 34 left, upper arm of switch 16 back to the plus terminal of rectifier 14. As has already been stated, contacts 29, and 31 and brushes 28 and 30 are arranged in such a manner that when contact is made simultaneously relay 32 will operate, the circuit being traced from battery 44 through resistance 45, brush 46, gear wheel 20, brush 30, contact 31, relay 32, contact 29, brush 28, gear wheel 10, brush 48 to ground. This relay 32 then locks from battery 44, through resistance 45, brush 46, gear wheel 20, commutator wheel 43, brush 51, left front contact adjacent to coil 32, relay 32 to ground at the other left front contact of relay 32. The conducting segment of wheel 43 and brush 51 are arranged in relation to brush 30 and contact 31 so that brush 51 will make contact with the conducting segment of wheel 43 before brush 30 leaves contact 31. Insulation 52 is arranged so that when brush 51 rides on insulation 52, relay 32 will release because its locking circuit is opened prior to the time that brush 30 touches contact 31. This locking circuit will keep lamp 33 lighted at the right hand contact of relay 32 nearly all of each rotation of the shaft 12, so that an attendant can see the condition at a glance at any particular moment. The circuit is arranged to release the relay 32 just before the brush 30 makes contact with segment 31 to get a new start for the operating circuit of relay 32 to give a new indication at each revolution of shaft 12 that the apparatus is still in phase and synchronism. In case shafts 2 and 12 get out of synchronism, relay 32 fails to operate. This allows relay 34 to operate and light lamp 35, when brush 30 touches contact 31. Relay 34 thus stops motor 13 until brush 28 touches contact 29, at which time relay 32 operates and releases relay 34 to restart motor 13.

Motor 13 may be a one fiftieth H. P., 50 volt, D. C. shunt field motor having a shunt field 53. The motor is driven through resistances by current from rectifier 14 having an output potential of approximately 150 volts. This high potential voltage of the rectifier is necessary for the proper operation of tube 37. Speed controlling armature resistance 42 is in the armature circuit. The variable resistance 41 is in the plate-cathode circuit of tube 37 and is shunted across resistance 42. Variable resistance 54 is in series with the field winding 53 shunted across the armature. These resistances may be adjustable in order to adjust the circuit for proper operation.

With the two shafts 12 and 2 operating in synchronism and in phase with each other the lamp 33 will be lighted during the major portion of each rotation, being extinguished only during the period of time between the breaking of the locking circuit for the relay 32 by the insulation 52 on the commutator wheel 43 and the reoperation of relay 32. Thus, the operator can see at a glance that the two shafts are in synchronism and in proper phase.

If the lamp 33 does not light, this is an indication that the shafts are out of the proper phase relation if not out of synchronism. For this condition the lamp 35 will light intermittently as the relay 34 operates each time the brush 30 touches the contact 31. Thus, in addition to the lamp 33 being extinguished, the out-of-phase condition will be indicated by the flashing of the lamp 35. However, this out-of-phase condition automatically corrects itself because the plate-cathode resistance of tube 37 will vary depending on the relative positions of the brushes 22 and 24 with respect to the potentiometers 23 and 25, as has already been explained. Because of the difference in speeds between shafts 17 and 12 and shafts 6 and 2, shaft 12 may be several turns ahead of or behind shaft 2. This difference will be eliminated by the speed up or slow-down action of the motor until the potentiometers are in the proper position to supply the plate and cathode of tube 37 with substantially the same potential.

Fig. 2 is a modification of Fig. 1 and is for the purpose of providing an alternate method of the control of motor 13. The three element tube 37 in Fig. 1 has been replaced by a power pentode tube 55 in Fig. 2. Heating element 39, which in Fig. 1 had been used as a cathode, is used only as a heating element in Fig. 2. The cathode 56 has been added for circuit operation and is connected to the lower left or negative contact of switch 16 and then directly to the armature of motor 13. Screen grid 57 in series with resistance 58 has been added to improve the operation and to provide more power. The screen grid 57 is connected to the upper left or positive contact of switch 16 and to the ends of resistances 41 and 54. The field winding 53 is used as an ordinary shunt winding, while the additional field winding 47 is arranged to aid or oppose the field winding 53 depending on the status of the plate current of the power pentode valve 55. Resistance 54 is in series with the armature and shunt field 53 of the motor. Resistance 42 is in series with the make contact of relay 34 and serves only the purpose of limiting the braking current when the motor acts momentarily as a generator when the power feed to the armature circuit is removed and while the armature is revolving. The armature is shunted by the make contact of relay 34 in series with the resistance 42 when the motor is acting as a generator and the generator current of the armature is dissipated in the resistance 42. Resistances 41 and 54 are adjusted to get the same relative speeds of the motors as described in Fig. 1. When the grid 36 of tube 55 is made more negative with respect to its cathode than its normal condition the motor speed increases due to the decrease of the plate current of the tube 55 flowing through the motor field winding 47. Vice versa when the grid becomes more positive than its normal condition the feed current through the motor field winding increases thereby causing the speed of the motor to decrease.

When the indicated elements are out of phase, relay 34 operates as described in Fig. 1. The operation of relay 34 opens the power feed to the armature circuit of the motor and connects the low resistance shunt 42 across the armature. Since the motor is rotating at this instant, and since field winding 47 is energized by the plate current flowing through it the motor acts as a generator for a short interval of time, causing the rotating armature to come to rest more quickly than otherwise. With this it is possible to stop the brush 30 on the leading edge of contact 31, a desirable feature for automatic and phase control.

It will be seen from the above that I have provided apparatus for maintaining a shaft in synchronism and in the proper phase relation with a continuously driven shaft which will not only indicate when the proper synchronism and phase relation is maintained and also when the shafts are not in their proper phase relation or are out of synchronism, but will also automatically slow down or speed-up the control shaft until it is in synchronism and in the proper phase relation with the driven shaft. The apparatus is simple, involving the use of two relays and a thermionic tube and may be operated with the control shaft at any desired distance from the driven shaft.

In case of a failure of the tube 37 or associated circuits in the structure of Fig. 1, the shaft 12 may still be brought into synchronism with the shaft 2 because of the action of the relay 34 in opening the armature circuit of the motor 13 each time the brush 30 passes the contact 31. Under a normal operation of the circuit the motor 13 stops when the relay 34 operates because of the action of the auxiliary field winding 47. If, however, the auxiliary winding 47 is out of the circuit, as, for instance, by opening the switch 59, the motor 13 will not stop but will slow down. Thus, the motor 13 is slowed down during the period of each rotation of the shaft 12 when the relay 34 is operated and this will eventually cause the shaft 12 to slip back a full rotation until it is in phase alignment again with the shaft 2. At this time the relay 32 will operate to break the circuit of the relay 34 and permit continuous operation of the motor 13. The motor control resistances 42 and 54 are preferably adjusted for this particular condition so that the motor 13 will tend to drive the shaft 12 slightly faster than the shaft 2.

In the particular embodiment described the shafts 2 and 12 are rotating at approximately 4 R. P. M., and at this slow speed it is important to bring the two shafts into phase alignment more quickly than could be done by the action of relay 34 alone. For high speeds of the shafts the vacuum tube 37 becomes less important.

The invention is subject to various other modifications than that disclosed and hence I do not desire to limit myself to the specific embodiments shown and described except by the limitations included in the appended claims.

What I claim is:

1. Apparatus for automatically synchronizing the rotation of and establishing phase relation of a second shaft with that of a continuously driven rotating first shaft comprising a motor connected to drive said second shaft, electro-responsive means associated with the motor to control the operation thereof, an energizing circuit therefor, movable contacts connected to rotate in synchronism with the respective shafts, co-acting stationary contacts positioned to be engaged by the movable contacts in related positions and circuit connections to the stationary contacts including a first relay effective to open the energizing circuit of the motor under determined out of phase relation of the shafts and to close the motor circuit for restarting when phase relation is restored and said energizing circuit including means to apply differential potential to the electro-responsive control means proportionate to the out of phase relation of the shafts and effective to restore the synchronism of the shafts, a commutator connected to be rotated by the second shaft and a circuit controlled thereby including a second relay actuating a movable contact in the first relay circuit to open the latter.

2. Apparatus as defined in claim 1 including circuit connections operative to generate rotation retarding forces to stop the motor when said second shaft is in a predetermined rotational position if said shafts are not in synchronism.

3. Apparatus as defined in claim 1 including circuit connections operative to generate rotation retarding forces to stop the motor when said second shaft is in a predetermined rotational position if said shafts are not in synchronism and adapted to start said motor when said first shaft reaches a rotational position corresponding to the predetermined position.

4. Apparatus as claimed in claim 1 including an auxiliary field winding for said motor and means to cause the current to flow through said winding in a direction to oppose the rotation of the armature of said motor.

5. Apparatus for automatically synchronizing rotation of and establishing phase relation of a second shaft with that of a continuously driven rotating first shaft comprising a motor connected to drive said second shaft, electro-responsive means associated with the motor to control the operation thereof, an energizing circuit therefor, movable contacts connected to rotate in synchronism with the respective shafts, co-acting stationary contacts positioned to be engaged by the movable contacts in related angular position, circuit connections to the stationary contacts including a first relay connected to open the energizing circuit of the motor under determined out of phase relation of the shafts and to close the motor circuit for restarting when phase relation is restored, said energizing circuit including means to apply differential potential to the electro-responsive control means proportionate to the out of phase relation of the shafts, a commutator connected to be rotated by the second shaft, a circuit controlled by the commutator including a second relay actuating a movable contact in the first relay circuit to open the latter and a circuit connection having a contact controlled by said second relay and operative for locking the latter.

6. Apparatus as claimed in claim 5 wherein the commutator effects closure of its circuit before opening of the associated movable contact circuit and retains the commutator circuit closed until immediately before reclosing of the movable contact circuit.

7. Apparatus as claimed in claim 5 wherein said first and second relay control contacts energize signal lamp circuits.

8. A system for starting a second shaft in rotational alignment with a continuously driven rotating first shaft and for automatically maintaining said second shaft in synchronism with said first shaft which comprises a motor connected in driving relation to said second shaft, means to start said motor, circuit means controlled by movable contacts connected to said shafts and operative to stop said motor when said second shaft reaches a predetermined rotational position, if said shafts are not in rotational alignment, said circuit means including a motor-energizing circuit, and relay-operated means for reclosing said circuit to start said motor again when said first shaft reaches the corresponding predetermined rotational position, said motor being provided with electro-responsive control means and an energizing circuit therefore including potentiometers associated with each of the shafts and connected to apply differential potential to said circuit to control the speed of said motor for restoring synchronizing of said shafts.

9. Apparatus for automatically synchronizing the rotation of and establishing phase relation of a second shaft with that of a continuously driven rotating first shaft comprising a motor connected to drive said second shaft, electro-responsive means associated with the motor to control the operation thereof, an energizing circuit therefor, movable contacts connected to rotate in synchronism with the respective shafts, co-acting stationary contacts positioned to be engaged by the movable contacts in related positions and circuit connections to the stationary contacts including a relay effective to open the energizing circuit of the motor under determined out of phase relation of the shafts and to close the motor circuit for re-starting when phase relation is restored and said energizing circuit including means to apply differential potential to the electro-responsive control means proportionate to the out of phase relation of the shafts and effective to restore the synchronism of the shafts, a commutator connected to be rotated by the second shaft and a circuit controlled thereby including means for controlling the operation of said relay.

10. Apparatus for automatically synchronizing the rotation of and establishing phase relation of a second shaft with that of a continuously driven rotating first shaft comprising a motor connected to drive said second shaft, electro-responsive means associated with the motor to control the operation thereof, an energizing circuit therefor, movable contacts connected to rotate in synchronism with the respective shafts, co-acting stationary contacts positioned to be engaged by the movable contacts in related positions and circuit connections to the stationary contacts including a relay effective to open the energizing circuit of the motor under determined out of phase relation of the shafts and to close the motor circuit for restarting when phase relation is restored and said energizing circuit including means to apply differential potential to the electro-responsive control means proportionate to the out of phase relation of the shafts and effective to restore the synchronism of the shafts, and means controlled by said second shaft for governing the operation of said relay.

GERALD DEAKIN.

REFERENCES CITED

The following references are of record in the file of this patent:

UNITED STATES PATENTS

| Number | Name | Date |
|---|---|---|
| 690,248 | Duane | Dec. 31, 1901 |
| 1,450,620 | Warren | Apr. 3, 1923 |
| 1,710,223 | Jacobson | Apr. 23, 1929 |
| 1,897,376 | Heath | Feb. 14, 1933 |
| 2,025,218 | Reinken | Dec. 24, 1935 |
| 2,081,652 | Turner et al. | May 25, 1937 |
| 2,208,623 | Bond | July 23, 1940 |
| 2,239,101 | Jeffers | Apr. 22, 1941 |
| 2,262,141 | Holcomb | Nov. 11, 1941 |
| 2,378,497 | Phillips | June 19, 1945 |

FOREIGN PATENTS

| Number | Country | Date |
|---|---|---|
| 507,929 | Germany | Sept. 24, 1930 |